Feb. 17, 1948. A. B. RYPINSKI 2,436,334
CURRENT-LIMITING AND PROTECTIVE ARRANGEMENT
Filed April 22, 1944 2 Sheets-Sheet 1

Albert B. Rypinski
INVENTOR.
George T. Gill
BY Attorney

Feb. 17, 1948. A. B. RYPINSKI 2,436,334
CURRENT-LIMITING AND PROTECTIVE ARRANGEMENT
Filed April 22, 1944 2 Sheets-Sheet 2

Albert B. Rypinski
INVENTOR.
BY George T. Gill
Attorney

Patented Feb. 17, 1948

2,436,334

UNITED STATES PATENT OFFICE 2,436,334

CURRENT-LIMITING AND PROTECTIVE ARRANGEMENT

Albert B. Rypinski, Laurelton, N. Y., assignor to Della C. Rypinski, Laurelton, N. Y.

Application April 22, 1944, Serial No. 532,325

16 Claims. (Cl. 323—90)

The invention herein disclosed relates to a current limiting and protective arrangement of the kind described in my copending application, Serial No. 421,460 filed December 3, 1941, for Current-limiting and protective arrangement on which application Patent No. 2,350,195 dated May 30, 1944, has been issued.

The arrangement disclosed in my aforesaid application includes a winding consisting of inductively coupled coils and means for varying the electrical relation of the winding to change the arrangement from one of relatively low impedance to one of relatively high impedance. In the arrangements therein illustrated, the means for varying the electrical relation of the windings are arrangements separate from the windings. In one specific form, these means consist of a thermostatically actuated switch for selectively opening the circuit through one of the coils.

An object of the present invention is to provide an arrangement of inductively coupled coils and means for varying the electrical relation of the coils wherein an auxiliary magnetic system within the inductively coupled coils is utilized to effect the variation in the electrical relation of the coils. Another object of the invention is to provide a construction and arrangement in which circuit controlling means are actuated by the magnetism of said auxiliary magnetic system. A further object of the invention is to provide such an arrangement that is suitable for three wire and polyphase circuits. Another object of the invention is to construct the inductively coupled coils and the means for varying their relation into a compact device suitable for being connected into a circuit.

The foregoing objects and certain advantages that will hereinafter appear are realized in the several embodiments of the invention illustrated in the accompanying drawings and described in detail below.

Figure 1:
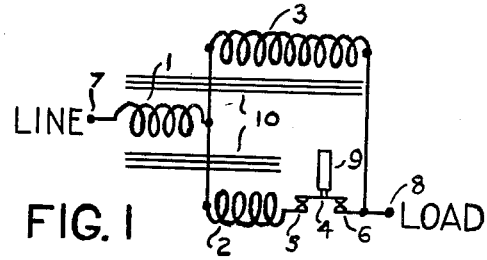
Figure 8:
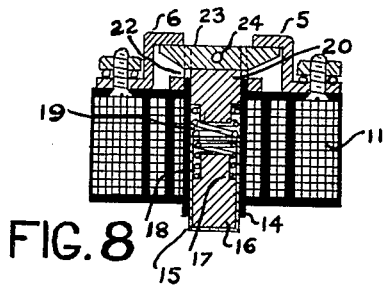
Figure 2:
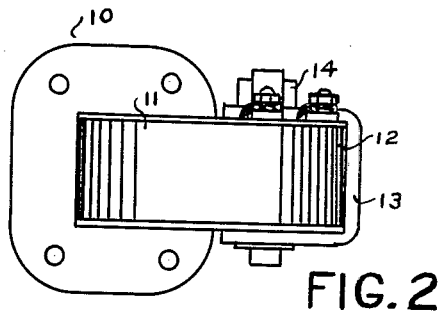
Figure 7:
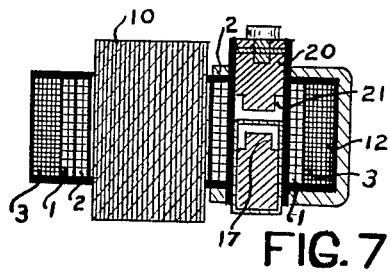
Figure 3:
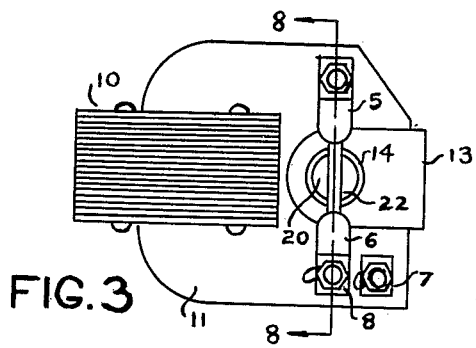
Figure 5:
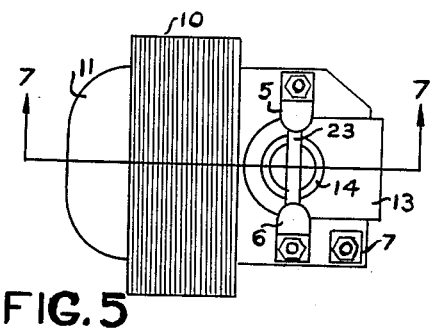
Figure 4:
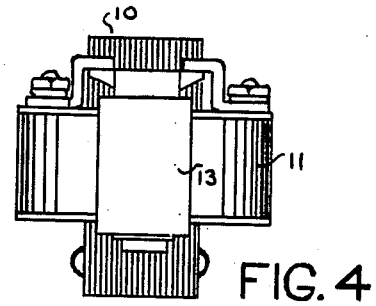
Figure 6:
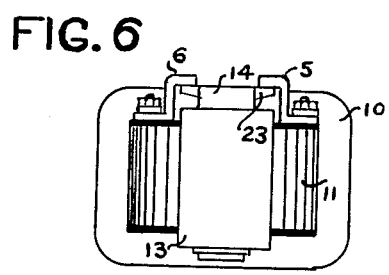
Figure 9:
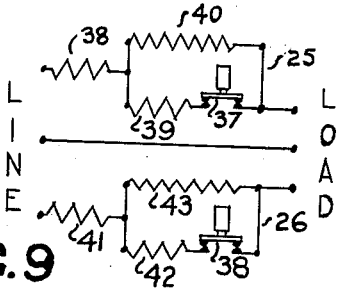
Figure 10:
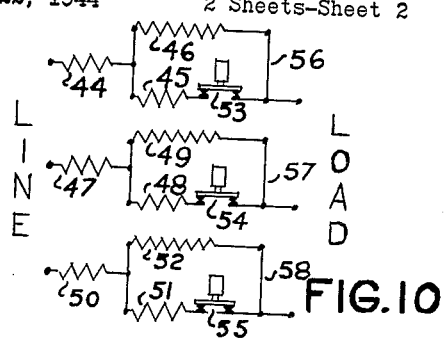
Figure 11:
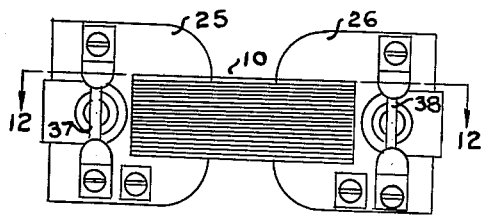
Figure 13:
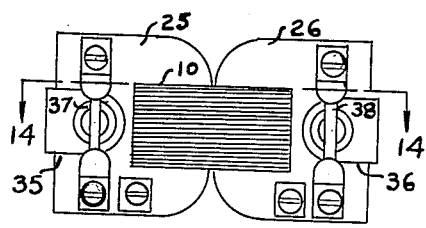
Figure 12:
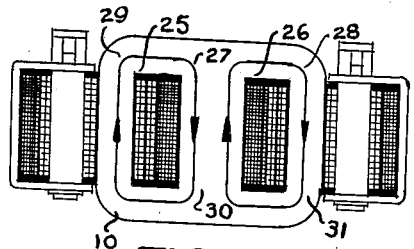
Figure 14:
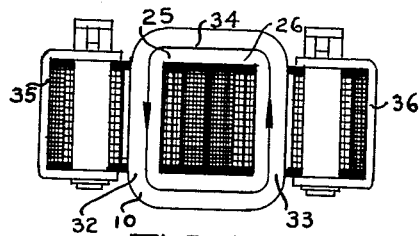
Figure 15:
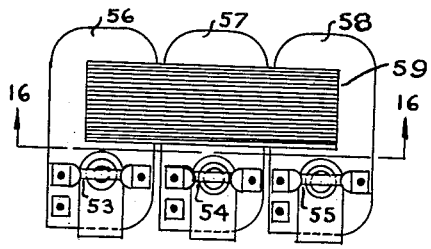
Figure 16:
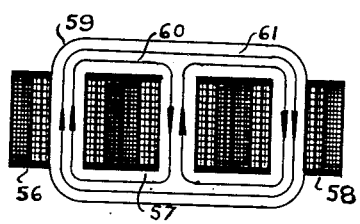

The drawings include:

Fig. 1 which is a diagrammatic representation of a current limiting protective arrangement embodying the invention;

Fig. 2 which is a side elevation of inductively coupled coils wound on a "core type" magnetic circuit and connected as illustrated diagrammatically in Fig. 1;

Fig. 3 which is a plan of the same;

Fig. 4 which is an end elevation of the same;

Fig. 5 which is a plan of a like arrangement with the coils wound on a "shell type" core;

Fig. 6 which is an end elevation of the same;

Fig. 7 which is a sectional elevation taken on the line 7—7 of Fig. 5;

Fig. 8 which is a sectional elevation taken on the line 8—8 of Fig. 3;

Fig. 9 which is a diagrammatic representation of the interconnection of a current limiting and protective arrangement in a three wire or polyphase circuit;

Fig. 10 which is a diagrammatic representation of the interconnection of a current limiting and protective arrangement in a three phase circuit;

Fig. 11 which is a plan view of a construction in which two windings are wound on a single core and which is suitable for interconnection in a circuit as represented in Fig. 9;

Fig. 12 which is a sectional elevation of the same taken on the line 12—12 of Fig. 11;

Fig. 13 which is a plan view of a modified construction in which two windings are wound on a single core;

Fig. 14 which is a sectional elevation of the same taken on the line 14—14 of Fig. 13;

Fig. 15 which is a plan view of a construction in which there are three windings on a single core; and Fig. 16 which is a sectional elevation of the same taken on the line 16—16 of Fig. 15.

In general, the arrangement and construction herein disclosed contemplates the arrangement of the winding on a core of the well-known "shell" or "core" type and the utilization of the end turns, i. e., those projecting beyond and not embraced by the core, to produce magnetic effects more or less independent of the magnetic effects of the winding on the core. An auxiliary core or cores may be provided locally at the end turns to increase the local magnetic action at this point.

It is a characteristic of the three coil winding shown in the aforementioned application, Serial No. 421,460, issued as Patent No. 2,350,195, that so long as a switching device in series with one winding is closed, it has practically zero magnetism within its core. With the end turn magnetic system to be described herein it is practicable to have the same windings which are producing zero magnetism in the main core, produce sufficient magnetism in the end turn system to move cores and contacts to control the functioning of the winding and so effects within the main core.

Referring to Fig. 1 a series current limiting winding of the type shown in the aforementioned Patent No. 2,350,195, is made up of coils 1, 2 and 3 wound on a core 10, the line wire connected at 7, the load wire at 8. The internal connections of this coil are those disclosed in the aforesaid patent, wherein coils 1 and 2 may be equal and opposed, and coil 3, of greater turns, paralleled with coil 2, a switching device 4 being included within the parallel connection to the coil 2. The characteristics of this winding are that it produces a minimum of impedance and magnetism with the switch 4 closed, and a maximum of impedance and magnetism when the switch 4 is opened. Each of the coils illustrated in this application is of this type and has these characteristics.

In Fig. 2 a core 10 carries a winding 11 consisting of a set of three coils, and the "end turn" portion 12 of this winding is arranged, as will be more fully explained hereinafter in connection with the description of the arrangement of Fig. 7, to operate a pair of movable cores and open or close the circuit between a pair of contacts 5 and 6 (Figs. 1 and 3). A U-shaped iron core 13 embraces the end turns 12 and provides a return magnetic circuit for the flux passing through the movable cores. The detail of construction of these cores and the movable and stationary contacts is best shown in Fig. 8. Winding 11 has an insulating tube 14 assembled within it. Within the tube 14 and secured therein is a second tube 15 which may be metallic, completely sealed and liquid-tight. Within the tube 15 is a movable iron core 16, shouldered at 17, (see also Fig. 7), and having a spring 18 resting on the shoulder and bearing against the upper end of tube 15. The metallic tube is filled, in all remaining space, with a suitable oil. The fit of core 16 in tube 15 is such as to permit the oil to pass slowly from one end of the core to the other as the core is alternately pulled up magnetically and pressed back by action of the spring. This imparts a time delay to the movement of core 16.

Tube 15 is secured in tube 14 by any suitable means (not shown), and above it is mounted a second spring 19 and a second movable core 20, shouldered at 21 (Fig. 7).

Core 20 and tube 14 are slotted at 22 to receive contact bridging member 23, pivoted on pin 24 extending through the core 20. Bridging member 23 serves to connect switch contacts 5 and 6 when held up in normal position by the spring 19. The purpose of having two cores, one time lagged and the other not, is to impart a time delay of considerable length on slight overloads with an almost instantaneous action when very heavy currents, such as short circuit currents, are present. Under slight overloads, the relatively long air gap between cores 16 and 20 results in a low value of magnetism and insufficient pull to allow core 20 to move. After a time delay, the core 16 may move up and reduce the air gap, thereby increasing the magnetism and pull to a point where core 20 is drawn down, opening the switch. With short circuit current values in the winding the magnetism and pull are greatly increased and the core 20 is drawn down at once, before core 16 has had time to move.

The same general description as that just given applies equally to the "shell type" device of Figs. 5, 6 and 7. Here a core 10 carries winding 11 having a separate electromagnet system in their end turns 12, the system including a U-shaped stationary core 13 and an insulating tube 14 containing an assembly just as described for the construction of Fig. 3, etc. A bridging bar 23 connects contacts 5 and 6.

Referring to Fig. 7, it will be observed that coils 1, 2 and 3, corresponding to those of the same number in Fig. 1, lie closely adjacent one another at the left of the figure, and this is their relation when they pass through the main core 10, whether this be the core of Fig. 2 or that of Fig. 5. To the right of Fig. 7 is an arrangement of these same coils which differs from that shown on the left, in that coils 1 and 2 have been separated and the movable core system placed between them. The result is that whereas on the left coils 1 and 2 neutralize each other magnetically and produce no resultant magnetism, on the right they assist each other in producing magnetism in the end turn magnetic system. Thus, the winding can be functioning at any given time to have zero magnetism in the main core or main magnetic circuit and an operable amount of magnetism in the end turn cores or auxiliary magnetic circuit. The location of coil 3 is such that it passes around the end turn movable cores and when coil 2 goes dead by reason of the switch 4 opening, coils 1 and 3 assist each other to maintain a desired amount of magnetism in the end turn cores.

It is, of course, feasible to vary the amount of magnetism acting on the end turn movable cores by different arrangements of the three coils and I do not limit myself to the particular one shown.

When a two wire circuit is to be controlled, the devices shown in Figs. 1 to 8 may be employed. When a three wire or polyphase circuit is to be controlled it is feasible to employ as many separate units, such as those shown in Figs. 1 to 8, as may be necessary, i. e., two for a three wire system, two or three for a three phase system. The wiring diagram for a three wire system is shown in Fig. 9, which also serves for a three phase system controlled by two units. A three phase, three unit system is shown in Fig. 10. These separate units, obviously, will work independently of each other, each having its own separate core. It may, however, be desirable to combine several windings on a single core and this can be done in a variety of ways depending on the operation desired.

Where several windings utilize a single core (a winding being considered as comprised of the three coil system shown in Fig. 1), the device may be made to function differently depending on whether the fluxes set up by each winding have separate or combined magnetic paths in the main core. Figs. 11 and 12 illustrate the former condition, Figs. 13, 14, 15 and 16 the latter.

In Figs. 11 and 12 two windings 25 and 26 are mounted on a single core 10 having three limbs 29, 30 and 31. Each winding is made up of three coils, and each winding has an end turn magnetic system similar to those previously described. The main magnetic circuit of the winding 25 is indicated by the loop 27, and the main magnetic circuit of the winding 26 by the loop 28. With this arrangement each coil will act independently of the other, and when one trips and the circuit through its contacts opens, the other will be unaffected electrically or magnetically. In other words, even though both windings are assembled on a single core for economy or other reasons, they will function as if each was mounted on a separate core.

In Figs. 13 and 14 two windings 25 and 26 are shown assembled on a single core having two limbs 32 and 33, so that all magnetism passing around the single loop 34 threads through both windings. The operation of these windings is made interdependent by reason of this condition. Fig. 9 may be taken as the diagram of connections of the windings 25 and 26 of Figs. 13 and 14.

As has been explained, each of the windings 25 and 26 may operate normally with almost zero magnetism in core 10; also, each may at the same time produce considerable magnetism in their local end turn magnetic systems 35 and 36. Should this local magnetism rise to a predetermined tripping value in one of the local circuits, say in 25, switch 37 would be opened by movement of the end turn cores to open the circuit through winding 39, Fig. 9. As previously shown, this will result in changing winding 25 from one of low impedance producing no magnetism to one of high impedance, producing a large amount of magnetism.

The condition in the winding 26 may be assumed to be such that, up to the instant switch 37 opens, there is not sufficient magnetism in the end turn magnetic system of winding 26 to open its switch 38. But as soon as switch 37 opens and a large amount of flux passes around the magnetic loop 34, it links with the coils of winding 26 and alters the electrical values in the several windings therein by transformer action. As long as there is zero or almost zero magnetism in the core 10 nearly all the current in coil 41, Fig. 9, passes down path 42—38, and almost none through coil 43. But as soon as the switch 37 opens and a relatively large amount of magnetism passes through the core 10, coils 42 and 43 and switch 38 constitute a closed loop cut by this flux, and a circulating current is generated therein. By properly arranging the relative polarities of windings 25 and 26 this circulating current may be made to add its effect to that of the current already flowing in winding 26 and produce sufficient magnetism in the end turn system thereof to cause switch 38 to open. Windings 25 and 26, each with one coil 39 and 42 open circuited, now assist each other in producing magnetism in core 10, and both coils now exhibit high impedance.

It will be thus seen that the arrangement of windings and core of Figs. 13 and 14 functions to cause both winding switches to trip when only one has an excess current therein. It differs in this respect from the previous showings wherein every winding is independent. The interdependent feature of Figs. 13 and 14 is essential in motor circuits, for example, where it is necessary to reduce the current in all legs of the circuit when one leg is overloaded.

Figs. 10, 15 and 16 illustrate a three phase three winding device wound on a single core, and with the windings interdependent, as just described. Coils 56, 57 and 58 are wound on the three limbs of a three phase core 59. Each winding has three coils, with a switching member in one coil. The magnetic action within the core 59 is similar to that in the well-known three phase transformer core where the flux generated by one coil threads each of the other coils. With switches 53, 54 and 55 all closed there will be almost no magnetism within the core 59. But if all three phases are carrying current and only one phase becomes overloaded and its switch trips open, the resultant flux in the core 59 will thread the two remaining windings, set up circulating currents in their loop circuits as described for Figs. 9, 13 and 14, and cause one or both of the remaining switches to trip open. If only one trips, that leaves one untripped, and the combined magnetic action of two windings is now acting to induce circulating current in the remaining coil and it will trip.

To illustrate, if winding 56 is overloaded but windings 57 and 58 are not, switch 53 will open first, causing windings 44 and 46 additively to produce magnetism around loops 60 and 61. Winding 57 will possibly have the greater circulating current, since it is nearest 56, and its switch 54 will open. Coils 47 and 49 will now add their vectorial magnetic effect to that of coils 44 and 46, and the magnetism threading winding 58 will increase, increasing the circulating current in loop 51, 52, 55 to a point at which switch 55 will trip. The impedance in all three phases will now be at its high value and the total line current be under control to the desired value.

If the line currents in either the two or three coil arrangement, with interdependent coils, are equal and excessive in all legs, the switches may open simultaneously, but if for any reason one or more lags behind, the electrical and magnetic effects explained above will insure their prompt opening.

The various switches are held open by the magnetism set up by the respective end turns, and when this magnetism subsides in the overloaded phase or leg by removal of the overload, the switch in that leg will close, the load circuit elements in the other leg or phase will draw only a normal current, and the remaining switch or switches will close. The device as a whole will now be back to its normal condition of low impedance and almost zero magnetism in the main core.

It will be obvious that various changes may be made by those skilled in the art in the arrangement of coils and windings and the constructions illustrated in the drawings and described in detail above within the principle and scope of the invention as expressed in the appended claims.

I claim:

1. An arrangement of the kind described comprising in combination a winding including stationary inductively coupled coils arranged to provide a magnetic circuit effecting the inductive coupling of the coils and an auxiliary magnetic circuit set up by all the inductively coupled coils acting jointly, and electromagnetically actuated means arranged in operative relation with respect to said auxiliary magnetic circuit.

2. An arrangement of the kind described comprising in combination a winding including inductively coupled coils arranged to provide a magnetic circuit effecting the inductive coupling of the coils and an auxiliary magnetic circuit, and means for varying the electrical relation of the coils upon the existence of a predetermined electrical condition including electromagnetically actuated means arranged within the winding in operative relation with respect to said auxiliary magnetic circuit.

3. An arrangement of the kind described comprising in combination a winding including inductively coupled coils arranged to provide a main magnetic circuit effecting the inductive coupling of the coils and an auxiliary magnetic circuit and such that substantially all flux in the main magnetic circuit threading one coil threads all coils and the coils being electrically interconnected to effectuate a minimum impedance under normal conditions and including two coils connected in series, and means for varying the electrical relation of the winding upon the flow of current in excess of a predetermined value including relatively movable cooperating contacts and electromagnetically actuated means for effecting relative movement of said contacts arranged in operative relation with respect to said auxiliary magnetic circuit.

4. An arrangement of the kind described comprising in combination a winding including inductively coupled coils arranged to provide a main magnetic circuit effecting the inductive coupling of the coils and an auxiliary magnetic circuit and such that substantially all flux in the main magnetic circuit threading one coil threads all coils and the coils being electrically interconnected to effectuate a minimum impedance under normal conditions and including two coils connected in series, and means for varying the electrical relation of the winding upon the flow of current in excess of a predetermined value including electromagnetically actuated means within the winding in operative relation with respect to said auxiliary magnetic circuit.

5. An arrangement of the kind described comprising in combination a winding including inductively coupled coils arranged to provide a main magnetic circuit effecting the inductive coupling of the coils and an auxiliary magnetic circuit and such that substantially all flux in the main magnetic circuit threading one coil threads all coils and the coils being electrically interconnected to effectuate a minimum impedance under normal conditions and including two coils connected in series, and means for varying the electrical relation of the winding upon the flow of current in excess of a predetermined value including relatively movable cooperating contacts and electromagnetically actuated means for effecting relative movement of the contacts within the winding in operative relation with respect to said auxiliary magnetic circuit.

6. An arrangement of the kind described comprising in combination a winding including inductively coupled coils wound and arranged such as to include end turns and to provide a magnetic circuit effecting the inductive coupling of the coils and an auxiliary magnetic circuit in the end turns, and electromagnetically affected means positioned to be affected by the magnetic effect of the auxiliary magnetic circuit.

7. An arrangement of the kind described comprising in combination a winding including inductively coupled coils wound and arranged such as to include end turns and to provide a magnetic circuit effecting the inductive coupling of the coils and an auxiliary magnetic circuit in the end turns, and electromagnetically affected means positioned in the end turn and arranged to be affected by the magnetic effect of the auxiliary magnetic circuit.

8. An arrangement of the kind described comprising in combination a winding including inductively coupled coils wound and arranged such as to include end turns and to provide a magnetic circuit effecting the inductive coupling of the coils and an auxiliary magnetic circuit in the end turns, and means for varying the electrical relation of the coils including relatively movable contacts and electromagnetically actuated means positioned in the end turn of the winding and arranged to be affected by the magnetic effect of the auxiliary magnetic circuit.

9. An arrangement of the kind described comprising in combination a winding including coils inductively coupled and wound and arranged to include end turns and to provide a main magnetic circuit such that substantially all flux in the main magnetic circuit threading one coil threads all coils and an auxiliary magnetic circuit in the end turn, and the coils being electrically interconnected to effectuate a minimum of impedance under normal conditions and including two coils connected in series, and means for varying the electrical relation of the winding upon the flow of current in excess of a predetermined value including relatively movable contacts and electromagnetically actuated means positioned in an end turn of the winding and arranged to be affected by the magnetic effect of said auxiliary magnetic circuit.

10. An arrangement comprising in combination a core, a winding including coils wound about the core inductively coupled and wound and arranged to include end turns and to provide a main magnetic circuit such that substantially all flux in the main magnetic circuit threading one coil threads all coils and an auxiliary magnetic circuit in the end turn, and the coils being electrically interconnected to effectuate a minimum impedance under normal conditions and including two coils connected in series, and means for varying the electrical relation of the winding upon the flow of current in excess of a predetermined value including relatively movable contacts and electromagnetically actuated means positioned in an end turn of the winding and arranged to be affected by the magnetic effect of said auxiliary magnetic circuit.

11. An arrangement of the kind described comprising in combination a plurality of windings on a single core, each winding including inductively coupled coils arranged to provide a magnetic circuit affecting the inductively coupled coils and an auxiliary magnetic circuit, and means associated with each winding for varying the electrical relation of the coils upon the existence of a predetermined electrical condition including electromagnetically actuated means arranged in operative relation with respect to the auxiliary magnetic circuit.

12. An arrangement of the kind described comprising in combination a plurality of windings on a single core, each winding including inductively coupled coils arranged to provide a magnetic circuit independent of any other winding and such that all flux threading one coil of the winding threads all coils of that winding and to provide an auxiliary magnetic circuit, and electromagnetically actuated means for each of said windings arranged in operative relation with respect to the said auxiliary magnetic circuit of the winding.

13. An arrangement of the kind described comprising in combination a plurality of windings on a single core, each winding including inductively coupled coils arranged to provide a magnetic circuit independent of any other winding and such that substantially all flux threading one coil of the winding threads all coils of that winding and to provide an auxiliary magnetic circuit, and means associated with each winding for varying the electrical relation of the coils of that winding upon the existence of a predetermined electrical condition, said means including electromagnetically actuated means arranged in operative relation with respect to the auxiliary magnetic circuit.

14. An arrangement of the kind described comprising in combination a plurality of windings on a single core, each winding including inductively coupled coils to provide a magnetic circuit common to the several windings and an auxiliary magnetic circuit, and means associated with each winding for varying the electrical relation of the coils upon the existence of a predetermined electrical condition including electromagnetically actuated means arranged in operative relation with respect to the auxiliary magnetic circuit.

15. An arrangement of the kind described especially adapted for a three phase circuit, which arrangement comprises in combination three windings on a single core, each winding including inductively coupled coils to provide a magnetic circuit common to the several windings and an auxiliary magnetic circuit, and means associated with each winding for varying the electrical relation of the coils upon the existence of a predetermined electrical condition including electromagnetically actuated means arranged in operative relation with respect to the auxiliary magnetic circuit.

16. An arrangement of the kind described comprising in combination a core having three limbs, a winding on each limb of the core, each winding including inductively coupled coils arranged to provide a main magnetic circuit effecting the inductive coupling of the coils and common to the three windings and an auxiliary magnetic circuit, and means associated with each winding for varying the electrical relation of the coils upon the existence of a predetermined electrical condition including electromagnetically actuated means arranged in operative relation with respect to the auxiliary magnetic circuit.

ALBERT B. RYPINSKI.

REFERENCES CITED

The following references are of record in the file of this patent:

UNITED STATES PATENTS

| Number | Name | Date |
|---|---|---|
| 2,187,523 | Pelikan | Jan. 16, 1940 |
| 2,350,195 | Rypinski | May 30, 1944 |